United States Patent
Nelson et al.

(10) Patent No.: US 9,389,851 B1
(45) Date of Patent: Jul. 12, 2016

(54) SYSTEM AND METHOD FOR PROVIDING CONSISTENCY BETWEEN SOFTWARE LIBRARY REPOSITORIES

(71) Applicant: ORACLE INTERNATIONAL CORPORATION, Redwood Shores, CA (US)

(72) Inventors: Mark Nelson, Lane Cove (AU); Leon Franzen, Redwood Shores, CA (US); Robert Patrick, Bartonville, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/728,327

(22) Filed: Jun. 2, 2015

(51) Int. Cl.
*G06F 9/44* (2006.01)
*G06F 17/30* (2006.01)

(52) U.S. Cl.
CPC ............ *G06F 8/71* (2013.01); *G06F 17/30106* (2013.01); *G06F 17/30377* (2013.01)

(58) Field of Classification Search
CPC   G06F 8/71; G06F 17/30106; G06F 17/30372
See application file for complete search history.

(56) References Cited

U.S. PATENT DOCUMENTS

| | | | |
|---|---|---|---|
| 7,107,589 B1 * | 9/2006 | Tal et al. .................... | G06F 8/65 707/999.003 |
| 7,707,219 B1 * | 4/2010 | Bruso et al. ....... | G06F 17/30362 707/687 |
| 8,595,715 B2 * | 11/2013 | Ward et al. ................ | G06F 8/71 717/168 |
| 2002/0040470 A1 * | 4/2002 | Guthrie et al. ........ | G06F 8/4442 717/126 |
| 2002/0112227 A1 * | 8/2002 | Kramskoy et al. .... | G06F 8/4442 717/148 |
| 2003/0041110 A1 * | 2/2003 | Wenocur et al. ...... | G06Q 10/107 709/206 |
| 2005/0071804 A1 * | 3/2005 | Miserocchi ............. | G06T 17/00 717/104 |
| 2007/0005745 A1 * | 1/2007 | Bertelsmeier et al. . | G06Q 10/00 709/223 |
| 2011/0161610 A1 * | 6/2011 | Gustafsson et al. .... | G06F 21/00 711/163 |
| 2012/0174124 A1 * | 7/2012 | Ward et al. ................ | G06F 8/71 719/331 |
| 2012/0215750 A1 * | 8/2012 | Stephenson ......... | G06F 9/45533 707/695 |
| 2012/0227034 A1 * | 9/2012 | Ibarra et al. ............... | G06F 8/71 717/145 |
| 2013/0339923 A1 * | 12/2013 | Xu et al. ................. | G06F 8/433 717/104 |
| 2015/0248643 A1 * | 9/2015 | Nathanson ......... | G06Q 10/0635 705/7.28 |

OTHER PUBLICATIONS

Oracle© Fusion Middleware Developing Applications Using Continuous Integration 12c (12.1.2), Feb. 2014, 108 pages.

* cited by examiner

*Primary Examiner* — Chameli Das
(74) *Attorney, Agent, or Firm* — Tucker Ellis LLP

(57) ABSTRACT

In accordance with an embodiment, described herein is a system and method for providing consistency between software library repositories. The system can be used to ensure that a repository of compile-time libraries is consistent with a target run-time or execution environment. Each of a plurality of libraries in an execution environment can be associated with a location file or metadata including coordinates for the library and a relative path to a library artifact. The system can use the metadata to populate or synchronize a particular library repository, for example a software developer's compile-time library, with libraries or artifacts associated with the metadata, from the execution environment. The populated or synchronized repository can subsequently be used by a user of a software build automation tool at compile time.

20 Claims, 6 Drawing Sheets

SYSTEM AND METHOD FOR PROVIDING CONSISTENCY BETWEEN SOFTWARE LIBRARY REPOSITORIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers, and software development, and are particularly related to a system and method for providing consistency between software library repositories.

BACKGROUND

In the area of software development, a software build automation tool, for example Maven, can be used to define a project coordinate-space that identifies particular versions of software libraries required for operations such as compiling, packaging, testing, and deploying a particular software code. A general assumption in such environments is that the content of any given version of a software artifact does not change unexpectedly, and that, if the content does need to be changed, then a new artifact is created with a new set of coordinates, typically including a new "version" coordinate.

However, some enterprise software vendors use library update and patching schemes which are not compatible with this assumption. For example, in some application server environments, when a one-off patch for a software library is issued, the version number of that library might not be increased. This can potentially create a scenario where a packed library in an execution environment does not match a corresponding library in a software developer's compile-time environment, even if their version numbers are the same.

SUMMARY

In accordance with an embodiment, described herein is a system and method for providing consistency between software library repositories. The system can be used to ensure that a repository of compile-time libraries is consistent with a target run-time or execution environment. Each of a plurality of libraries in an execution environment can be associated with a location file or metadata including coordinates for the library and a relative path to a library artifact. The system can use the metadata to populate or synchronize a particular library repository, for example a software developer's compile-time library, with libraries or artifacts associated with the metadata, from the execution environment. The populated or synchronized repository can subsequently be used by a user of a software build automation tool at compile time.

DETAILED DESCRIPTION

As described above, in the area of software development, a software build automation tool, for example Maven, can be used to define a project coordinate-space that identifies particular versions of software libraries required for operations such as compiling, packaging, testing, and deploying a particular software code. However, although a general assumption in such environments is that the content of any given version of a software artifact does not change unexpectedly, and that, if the content does need to be changed, then a new artifact is created with a new set of coordinates, typically including a new "version" coordinate, some enterprise software vendors use library update and patching schemes which are not compatible with this assumption.

In accordance with an embodiment, described herein is a system and method for providing consistency between software library repositories. The system can be used to ensure that a repository of compile-time libraries is consistent with a target run-time or execution environment. Each of a plurality of libraries in an execution environment can be associated with a location file or metadata including coordinates for the library and a relative path to a library artifact. The system can use the metadata to populate or synchronize a particular library repository, for example a software developer's compile-time library, with libraries or artifacts associated with the metadata, from the execution environment. The populated or synchronized repository can subsequently be used by a user of a software build automation tool at compile time.

In accordance with an embodiment, the approach can be used in an enterprise software environment, to enable an end user developer to populate a compile time local repository, from an execution environment, while ensuring that the libraries in their local repository and the execution environment match exactly, and without requiring them to make changes to their build environment, for example Maven, or to the versioning or patching scheme used by the enterprise software. Additional advantages of various embodiments can include:

Reducing or eliminating the need to have the enterprise software installed on the build machine(s) where the build is executed, which could otherwise have significant license cost value for the end user;

Enabling the end user to use modern, commonly used build automation tools, as there is a large pool of resources in the industry that are familiar with these tools, which can increase the end user's ability to obtain skilled resources and reduce cost of resources; and Enabling the end user to quickly check and ensure that the libraries in a build-time repository are exactly equivalent to those in the execution environment.

Figure 1:
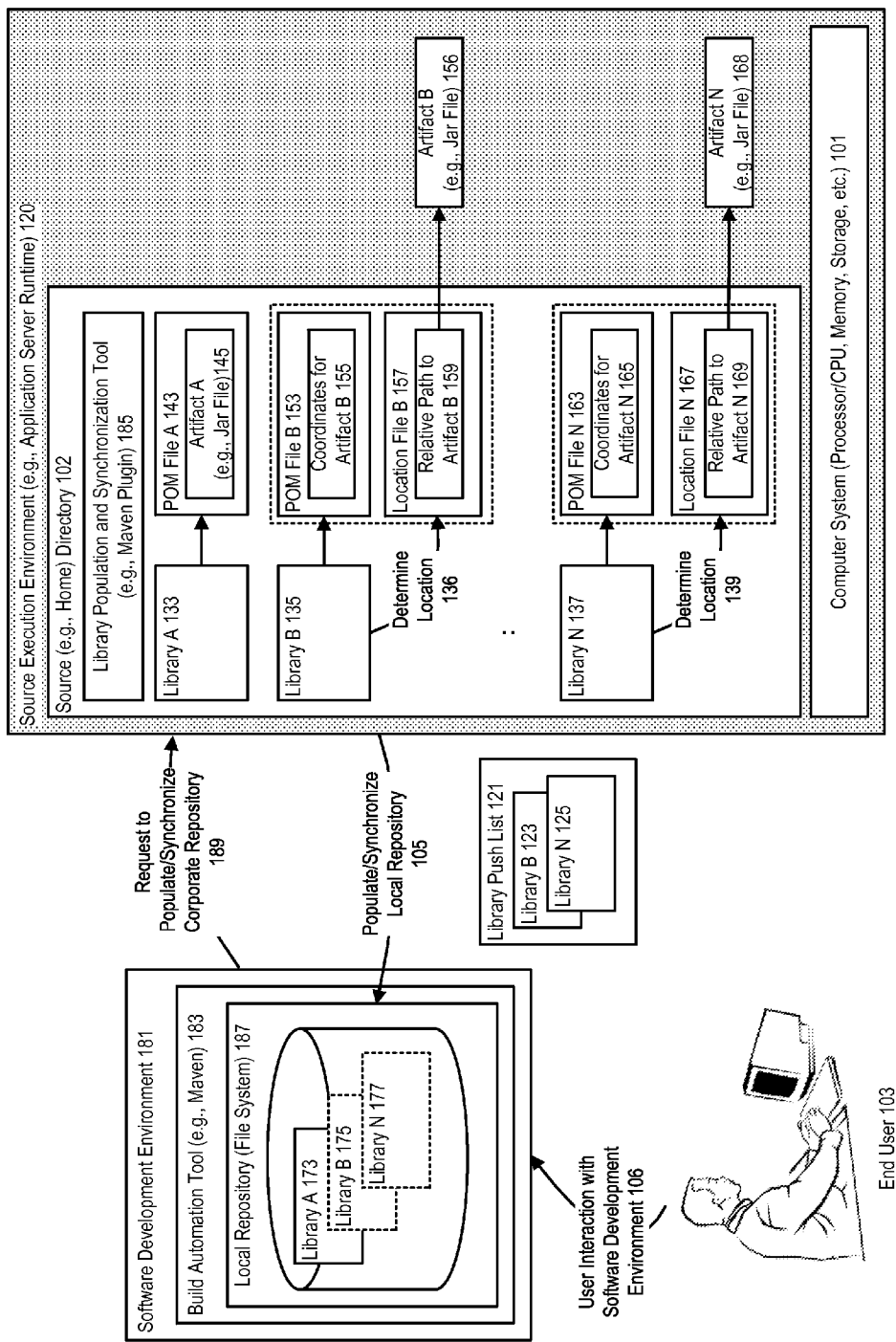
FIG. 1 illustrates a system for providing consistency between compile-time and run-time software library repositories, in accordance with an embodiment.

FIG. 1 illustrates a system for providing consistency between compile-time and run-time software library repositories, in accordance with an embodiment.

As shown in FIG. 1, a source execution environment 120, for example an application server or other enterprise software environment, executing on a computer system 101 including a processor, memory, storage, etc., can include a plurality of software libraries (for example, library A 133, library B 135, and library N 137) installed in a source directory 102 (for example, a "Home" directory). In accordance with an embodiment, the libraries are generally those libraries that are needed for compilation, packaging, testing and deployment of a software application.

In accordance with an embodiment, each of the libraries can be associated with a library file (for example, a POM file A 143, POM file B 153, and POM file N 163) that includes metadata (for example, coordinates 155 or 165) for that library.

In accordance with an embodiment, a POM (Maven project object model) file can specify a group identifier, an artifact identifier, a version number, a packaging type, and possibly some other optional coordinates. In accordance with other embodiments, other types of library file can be used.

In accordance with an embodiment, the library files for the libraries can be located in one or more well-known directories under the source directory; for example, in an Oracle environment, the library files can reside in an "Oracle home" directory and its subdirectories. However, the actual artifacts of these libraries can be located in one or more different directories for easy management.

In accordance with an embodiment, some library files (for example, POM file A 143) can directly include one or more artifacts (for example, artifact A 145); while other files (for example, POM file B 153 or POM file N 163) can be associated with a location file (for example, location file B 157, and location file N 167), which provides a relative path to an actual artifact.

For example, location file B can indicate a relative path 159 to artifact B (for example, a Jar file) 156; while location file N can indicate a relative path 169 to artifact N 168). Such information can be later used to determine 136, 139, the location of a particular artifact.

As further shown in FIG. 1, in accordance with an embodiment, a software development environment 181 can include a build automation tool 183 (for example, Maven), which is associated with a local repository or file system 187 for storing versions of libraries A 173, B 175, and N 177, for use at compile time by an end user 103 that interacts 106 with the local repository.

In accordance with an embodiment, a library population and synchronization tool 185 (for example, a Maven plugin) can be provided as a plugin to the source execution environment, to ensure consistency between library repositories in the local repository and the source execution environment. The end user can invoke the library population and synchronization tool 189 to populate 105 the local repository with libraries from the source execution environment when, for example, the local repository is empty; and/or to synchronize 105 the source execution environment with the local repository if one or more libraries needed at compile time have been updated or patched in the source execution environment.

In accordance with an embodiment, the library population and synchronization tool can process metadata contained in the library files (e.g., POM files) associated with the libraries in the source execution environment, to determine 189 which artifacts or libraries therein are to be pushed to the local repository. The libraries to be pushed to the local repository can be identified in a data structure, for example, a library push list 121.

For example, as shown in the example of FIG. 1, the library push list can indicate two libraries B 123 and N 125, to be pushed to the local repository.

In accordance with an embodiment, the source execution environment can be an application server runtime, e.g., Oracle WebLogic Server runtime. The library population and synchronization plugin can be a Maven plugin to a particular software environment (for example, an Oracle Home). The software libraries can be Jar files or other binary files for use with, e.g., Fusion Middleware or other enterprise software products.

In accordance with an embodiment, the library population and synchronization tool can be invoked by the end user, or by a system administrator responsible for maintaining the corporate repository.

In accordance with an embodiment, the library population and synchronization tool can locate the library files that describe the libraries in the source execution environment. For each library file located, if a matching location file and a corresponding library are both found, the library is added to a data structure; however, if a matching location file is found but the library is not found, an error is generated. Alternatively, when a matching location file is not found, if the library file specifies one or more artifacts that can be located without the need of a location file, the library can be added to the data structure; otherwise, an error is generated.

As an illustrative example of a library file described above, a POM file with a packaging type of "POM" can define a container of submodules, each submodule represented by a subdirectory in the same directory as the POM file.

In accordance with an embodiment, the library population and synchronization tool can be invoked to push each library or entry in the data structure, to a defined target repository, for example the local repository or the public facing corporate repository. The library population and synchronization tool can first check if the library exists in the defined target repository. If it does, the library population and synchronization tool can check if the library in the defined target repository is exactly the same as the library in the source execution environment using, e.g. MD5SUM or another checksum technique.

If the libraries are exactly the same, then nothing needs to be done; otherwise, the library in the defined target repository is replaced with the corresponding library in the source execution environment.

In accordance with an embodiment, if the library does not exist in the defined target repository, then the library population and synchronization tool can install the library from the source execution environment to the defined target repository.

If the library has been previously modified by a user, then the system administrator or another user invoking the population and synchronization tool can be warned that the modified library is to be replaced; and can be prompted for selecting whether to replace the modified library in the local repository.

Listing 1 below illustrates an exemplary algorithm that can be used for populating a defined target repository with libraries from a source execution environment, and synchronizing the defined target repository with the source execution environment, in accordance with an embodiment.

Listing 1

```
For each POM file in the execution environment:
    If the matching location file exists:
        If the library exists:
            Add the library to the list to push
        Else:
            Output an error - the library does not exist
    Else:
        If the packaging coordinate is 'POM':
            Add the library to the list to push
        Else:
            Output an error - the location file is missing
For each entry in the list to push:
    If the library exists in the repository:
        If the library is the same (using MD5 sum):
            Do nothing
        Else:
            Replace the library
    Else:
        Install the library into the repository
```

Using a process such as that shown in Listing 1, the library population and synchronization tool can start by searching for files created for libraries needed for compilation, packaging, testing and deployment of a software application; create a list of libraries that are determined to be pushed to a defined repository; and process the list of libraries in accordance with a set of rules.

Figure 2:
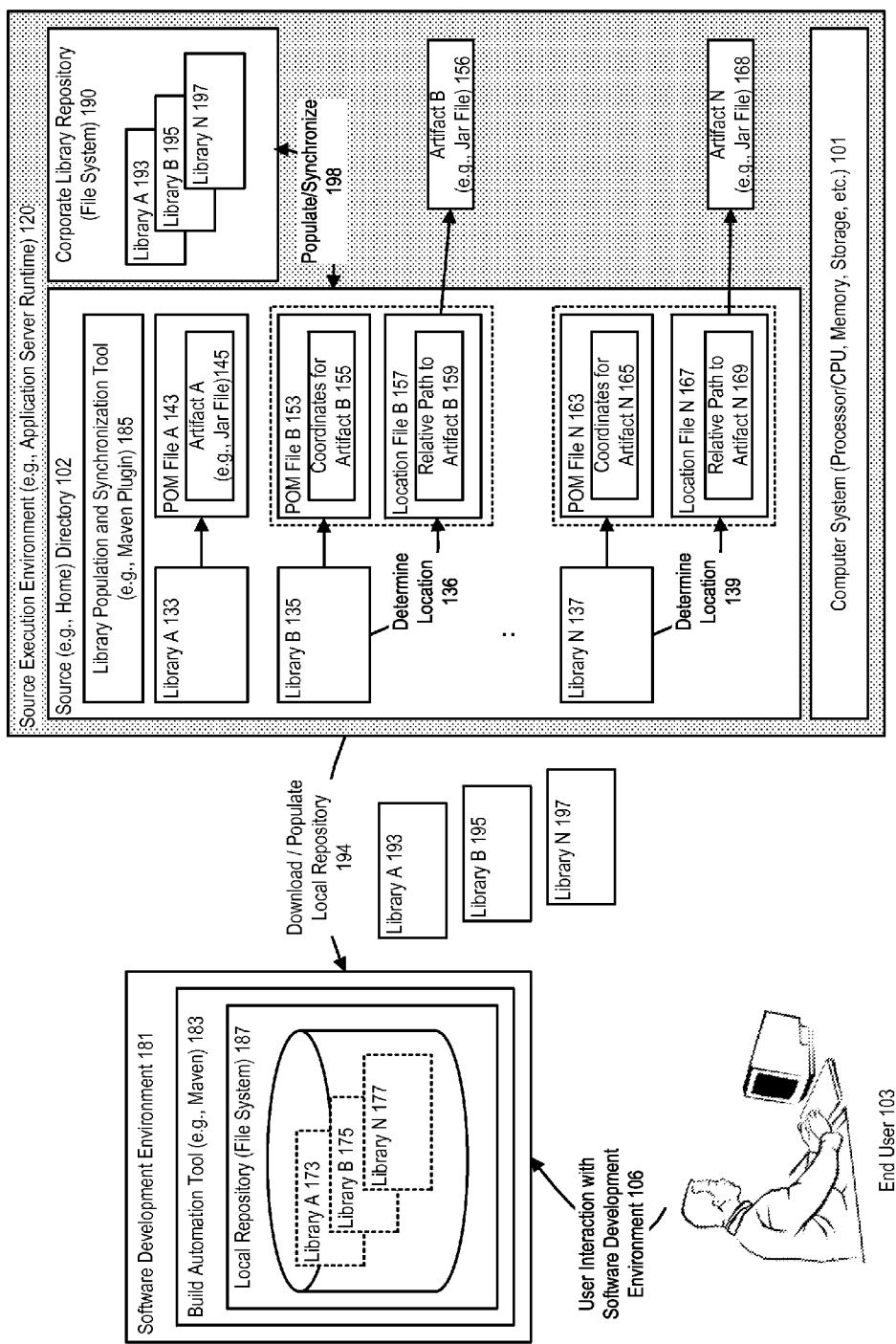
FIG. 2 further illustrates a system for providing consistency between compile-time and run-time software library repositories, in accordance with an embodiment.

FIG. 2 further illustrates a system for providing consistency between compile-time and run-time software library repositories, in accordance with an embodiment.

In accordance with an alternative embodiment, the library population and synchronization tool can be used to populate or synchronize 198 a public-facing corporate repository or file system 190 for use by other users. In accordance with an embodiment, when populating or synchronizing the public facing corporate repository, the same approach for populating or synchronizing the local repository can be used.

In accordance with an embodiment, the corporate repository can include proprietary libraries (for example, library A 193, library B 195, and library N 197) maintained and updated by a designated administrator in a company. The corporate repository, which is made available to users outside the company, can facilitate the use by the outside users of a particular development platform supported by the company.

As shown in FIG. 2, when used the first time, the local repository 187 may be empty. In accordance with an embodiment, at compile time, the build automation tool can automatically download 194 libraries (for example, library A 193, library B 195 and library N 197) and their dependent libraries needed for compilation from the source execution environment or public-facing corporate repository.

Figure 3:
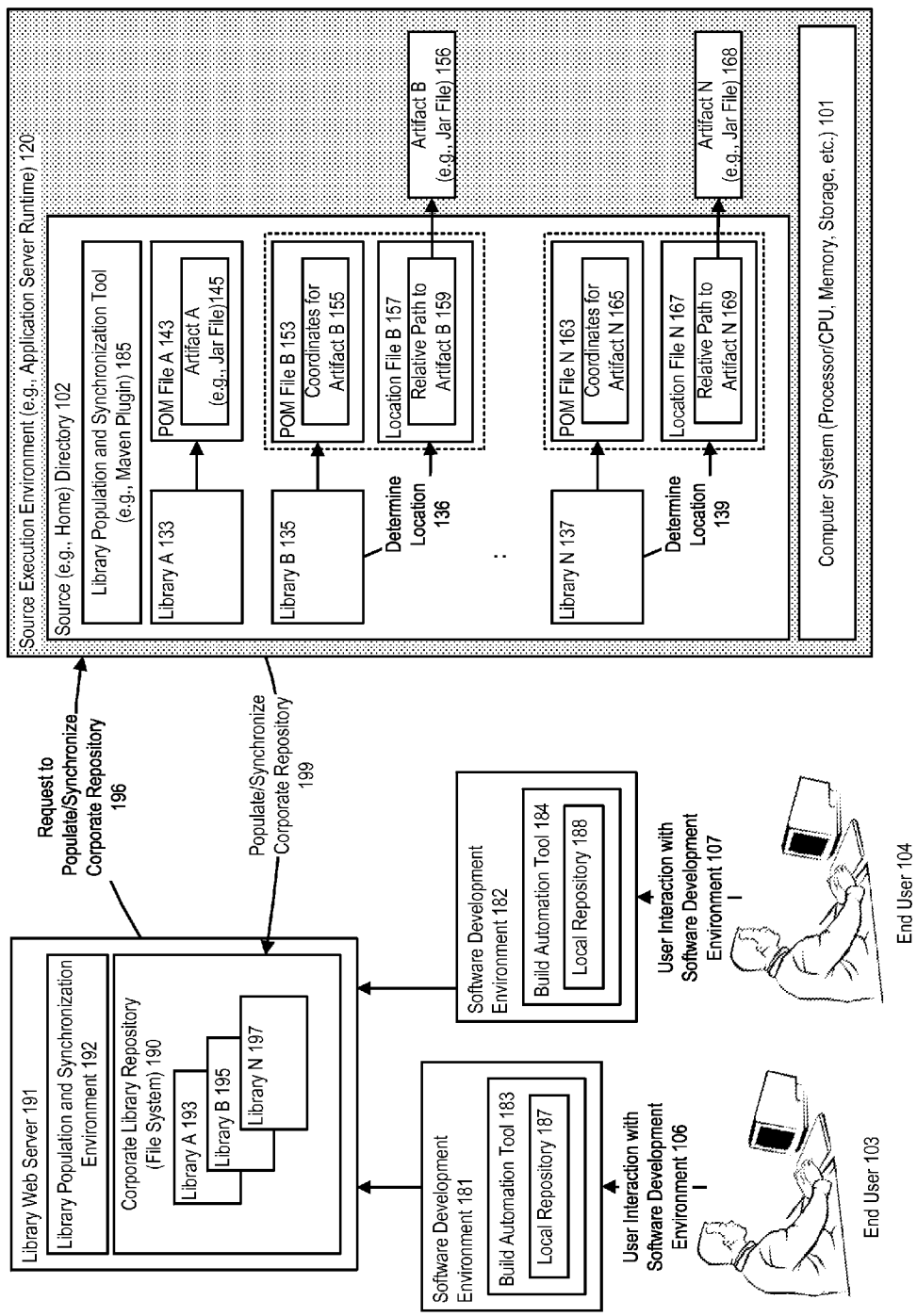
FIG. 3 further illustrates a system for providing consistency between compile-time and run-time software library repositories, in accordance with an embodiment.

FIG. 3 further illustrates a system for providing consistency between compile-time and run-time software library repositories, in accordance with an embodiment.

As shown in FIG. 3, in accordance with an embodiment, the public facing corporate repository can be hosted on a separate host, for example a web server 191 for use by users within and outside the company. The corporate repository can be associated with a library population and synchronization environment 192, and maintained by a system administrator, who monitors the source execution environment for updates or patches. Whenever the source execution environment is patched or updated, the system administrator can request 196 the corporate repository to be populated or synchronized by invoking the library population and synchronization tool, which can determine artifacts used to populate or synchronize 199 the corporate repository.

In accordance with an alternative embodiment, the library population and synchronization tool can be automatically triggered at configurable time intervals; or by any update or patch detected by an application that monitors the source execution environment.

In accordance with an embodiment, using a process similar to that described above, the library population and synchronization tool can create a list of libraries or artifacts for pushing to the corporate repository using a combination of factors including whether a library can be located.

The library population and synchronization tool can process each library in the list. If that library in the list does not exist in the corporate repository, the library population and synchronization too can install that library to the corporate repository. If differences are detected between that library in the list and a corresponding library in the corporate repository, the library population and synchronization tool can replace the corresponding library with that library in the list. However, that library in the list and the corresponding library are exactly the same in terms of contents and version numbers, nothing needs to be done.

In accordance with an embodiment, when a corresponding library in the corporate repository is to be replaced, the population and synchronization tool can check if the corresponding library has been previously modified by a system administrator based on one or more property files maintained in the corporate repository.

Similarly as described above, if the library has been previously modified, then system administrator or another user invoking the population and synchronization tool can be warned that the modified library is to be replaced; and can be prompted for selecting whether to replace the modified library in the corporate repository.

As further shown in FIG. 3, in accordance with an embodiment, the corporate repository can be made available for use by a plurality of end users, for example end users 103 and 104. To use the corporate repository, each end user can synchronize an associated local repository (for example, local repository 187 or 188) with the corporate repository at compile time, where each associated local repository resides in a different software development environment (for example, software development environment 181 or 182) that includes a build automation tool (for example, build automation tool 183 or 184).

Figure 4:
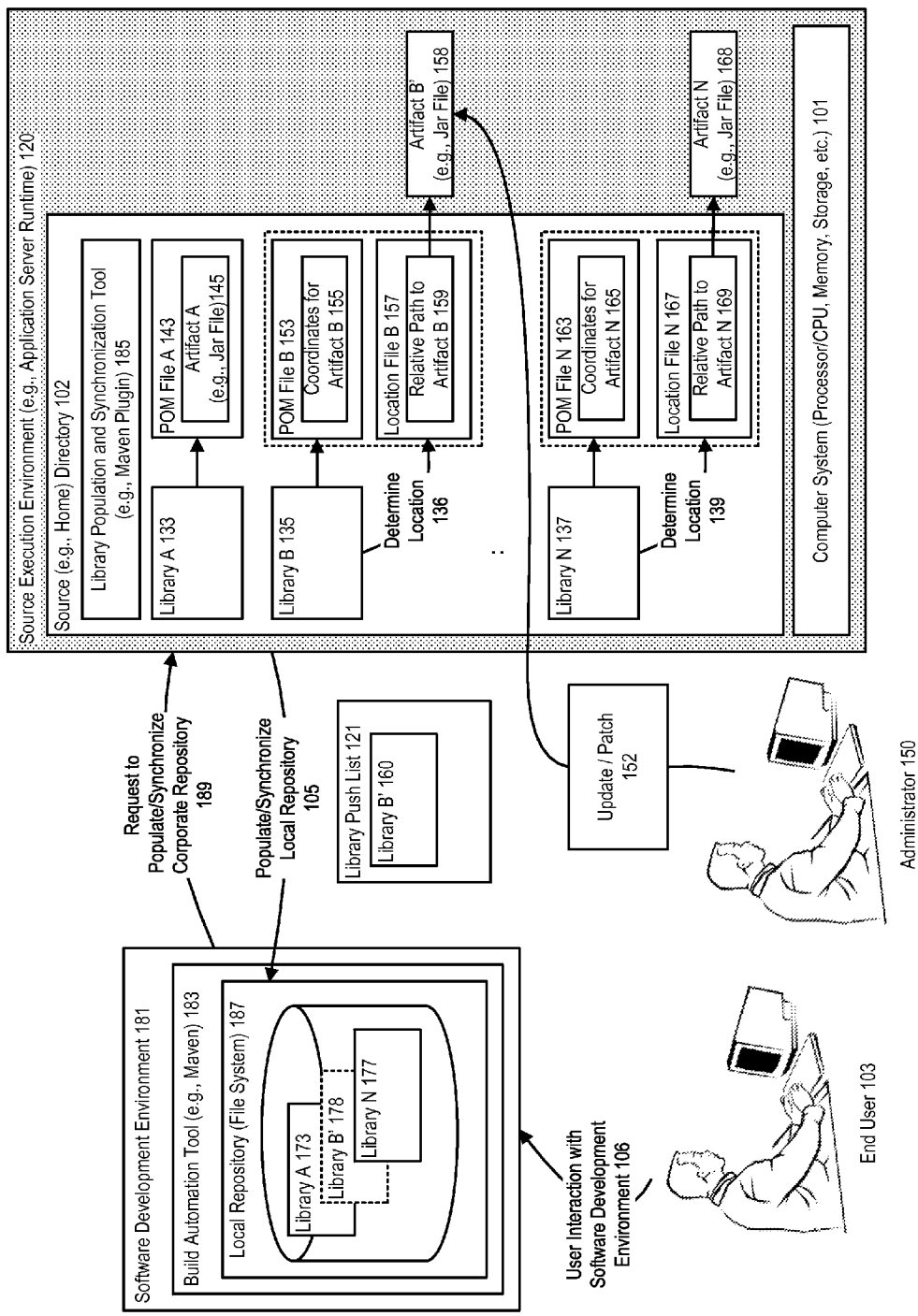
FIG. 4 further illustrates a system for providing consistency between compile-time and run-time software library repositories, in accordance with an embodiment.

FIG. 4 further illustrates a system for providing consistency between compile-time and run-time software library repositories, in accordance with an embodiment.

As shown in FIG. 4, in accordance with an embodiment, the library population and synchronization tool can be invoked by an end user, to directly synchronize the source execution environment and the local repository without going through the corporate repository.

This feature can be useful when, for example, a system failure prevents a timely synchronization between the corporate repository and the source execution environment where one or more artifacts (for example artifacts B 156) have been patched or updated.

As shown in FIG. 4, an administrator 150 can update Artifact B to B' 158 by applying an update or patch 152. The library population and synchronization tool, once invoked by the end user, can create a data structure that includes that patched or updated artifact 160, determine that Artifact B' is different from a corresponding library (for example library B 175) in the local repository, and replace that corresponding library with the patched or updated artifact B' 178.

Similarly as described above, in accordance with an embodiment, before replacing a corresponding library in the local repository, the population and synchronization tool can check if the corresponding library has been previously modified by the end user based on one or more property files maintained in the local repository. If the library has been previously modified, the end user can be warned that the modified library is to be placed, and prompted for selecting whether to replace the modified library.

Figure 5:
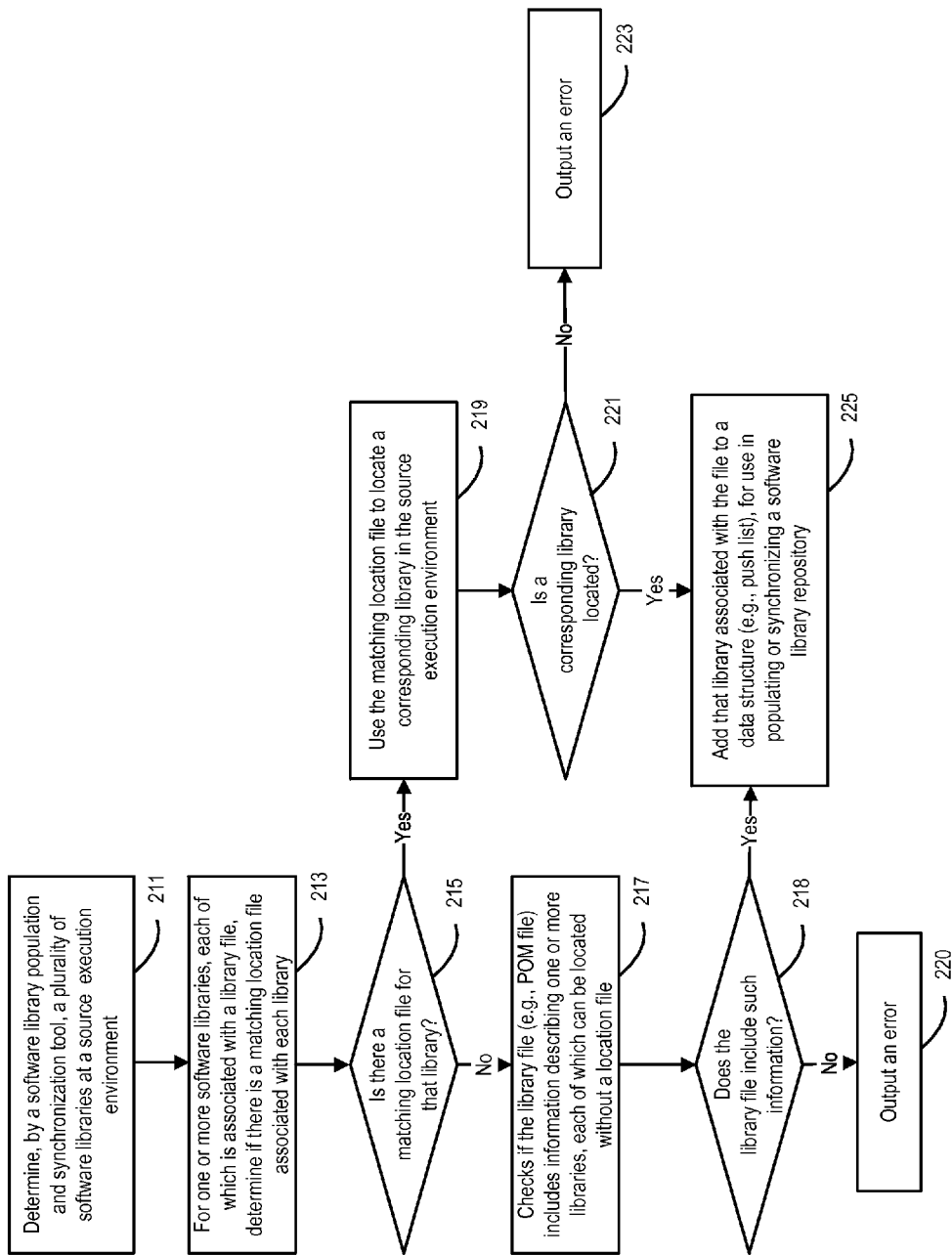
FIG. 5 is a flow chart that illustrates a method of populating a repository with libraries from an execution environment, in accordance with an embodiment.

FIG. 5 is a flow chart that illustrates a method of populating a repository with libraries from an execution environment, in accordance with an embodiment.

As shown in FIG. 5, at step 211, a library population and synchronization tool is invoked to determine a plurality of software libraries at a source execution environment.

At step 213, the library population and synchronization tool is used to determine, for one or more software libraries, each of which is associated with a library file, if there is a matching location file associated with each library.

At step 215, the library population and synchronization tool determines whether a matching location file for that library is located.

At step 219, if a matching location file is located, the library population and synchronization tool uses the matching location file to locate a corresponding library in the source execution environment.

At step 221, the library population and synchronization tool determines whether a corresponding library is located.

At step 225, when the corresponding library is located, it is added to a data structure, for example a list for pushing to a defined repository. Otherwise, an error is outputted, for example, to indicate that no corresponding library is located, as shown at step 223.

At step 217, when a matching location file is not located, the library population and synchronization tool checks if the associated library file includes information describing one or more libraries, each of which can be located without a location file.

At step 218, at step 218, the population and synchronization tool determines whether the library file includes such information. If it does, the library population and synchronization tool adds the library to the data structure for pushing to a defined repository. Otherwise, an error is outputted, as shown at step 220.

Figure 6:
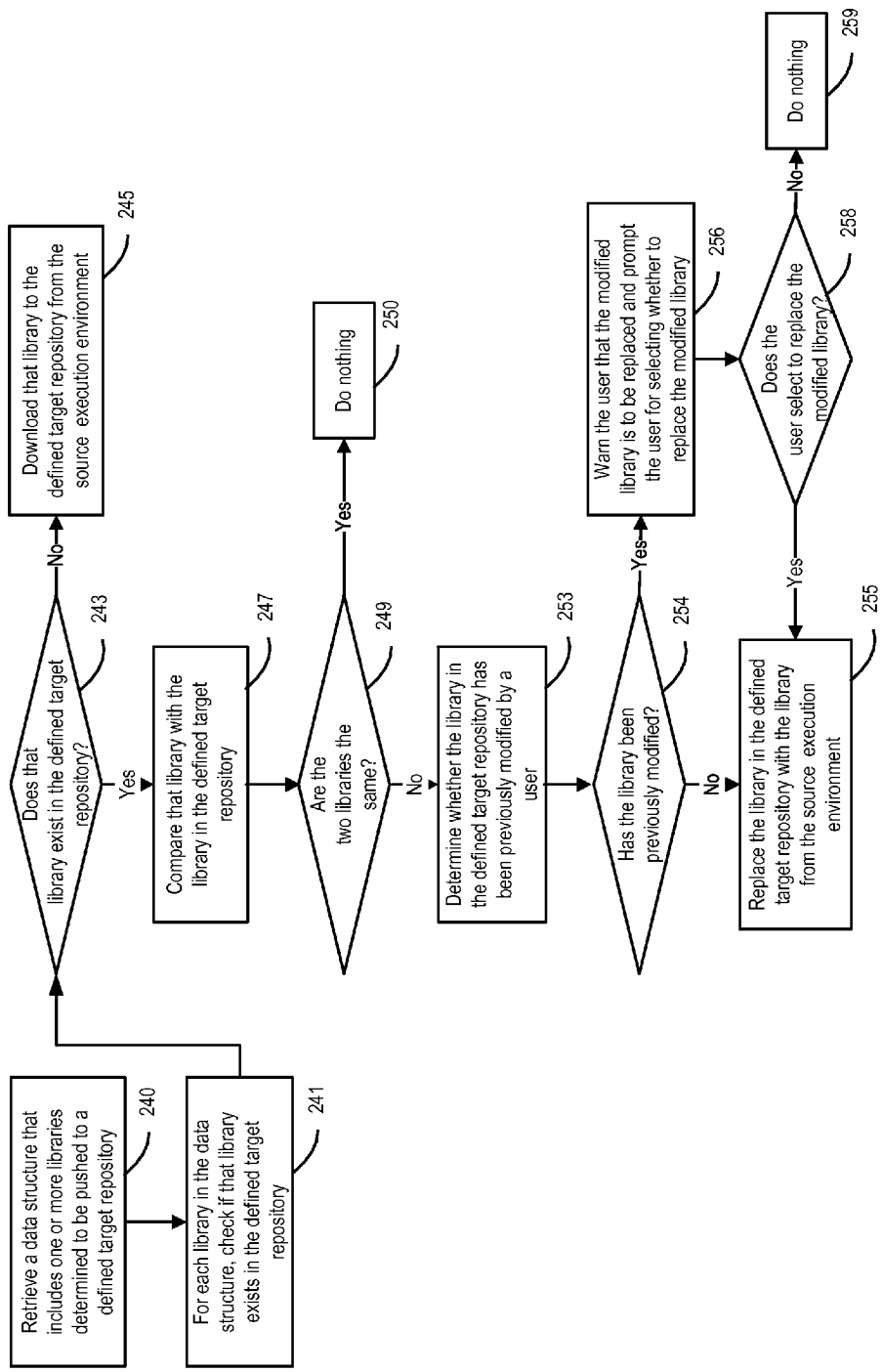
FIG. 6 is another flow chart that illustrates a method of populating a repository with libraries from an execution environment, in accordance with an embodiment.

FIG. 6 is another flow chart that illustrates a method of populating a repository with libraries to be pushed to a defined target repository from an execution environment, in accordance with an embodiment.

As shown in FIG. 6, at step 240, a data structure that includes one or more libraries from the source execution environment can be retrieved.

At step 241, for each library in the data structure, the library population and synchronization tool checks if that library exists in the defined target repository.

At step 243, the library population and synchronization tool determines whether that library exists in the defined target repository.

At step 247, when that library exists in the defined target repository, the library population and synchronization tool compares whether the two libraries are the same, and makes a determination as shown at step 249.

At step 250, when the two libraries are determined to be the same, nothing needs to be done.

At step 253, when the two libraries are determined to be different, the library population and synchronization tool checks whether the library in the defined repository has been previously modified by a user.

At step 254, the population and synchronization tool determines whether the library has been previously modified by the user.

At step 255, when it is determined that the library has not been modified, the population and synchronization tool proceeds to replace the library.

At step 256, when it is determined that the library has been modified, the user is warned that the updated library is to be replaced, and prompted for selecting whether to replace the modified library.

At step 258, the user makes a selection whether to replace the modified library.

At step 259, if the user selects not to replace the modified library, nothing needs to be done. Otherwise, the modified library can be replaced.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing consistency between compile-time and run-time software library repositories, comprising:
 a computer including one or more microprocessors;
 an execution environment, on the computer, that includes a plurality of software libraries, wherein each software library is associated with a library file describing that software library;
 a population and synchronization tool plugged into the execution environment, wherein the population and synchronization tool operates to
  search for each library file associated with a software library
  create a data structure that includes one or more software libraries based on the library file or a corresponding location file, and process each software library in the data structure to update a defined repository for use at compile time by performing the steps of
  determining that a software library with a same name already exists in the defined depository
  determining that the two software libraries include different contents, and
  replacing the software library in the defined repository with that software library in the data structure,
  wherein the population and synchronization tool, before performing the replacement, operates to determine whether the software library to be replaced in the defined repository has been previously modified by a user, and, if the software library is determined to have been modified, warn the user that the modified software library is to be replaced.

2. The system of claim 1, wherein the library file is a project object model (POM) file that defines coordinates for that software library.

3. The system of claim 1, wherein the corresponding location file defines a relative path to an actual binary file associated with a software library.

4. The system of claim 1, where the data structure includes at least one software library associated with a library file that includes POM as a packaging type.

5. The system of claim 1, wherein the population and synchronization tool operates to install the software library in the data structure to the defined repository if that software library does not already exist in the defined repository.

6. The system of claim 1, wherein the population and synchronization tool is triggered either manually by a user or automatically at a configurable interval.

7. The system of claim 1, wherein, upon the warning, the user is prompted to select whether to replace the software library in the defined repository with that software library in the data structure.

8. A method for providing consistency between compile-time and run-time software library repositories, comprising:
  providing an execution environment, executing on one or more microprocessors, that includes a plurality of software libraries, wherein each software library is associated with a library file describing that software library; and
  invoking a population and synchronization tool plugged into the execution environment, wherein the population and synchronization tool operates to
    search for each library file associated with a software library
    create a data structure that includes one or more software libraries based on the library file or a corresponding location file, and
    process each software library in the data structure to update a defined repository for use at compile time by performing the steps of
      determining that a software library with a same name already exists in the defined depository
      determining that the two software libraries include different contents, and
      replacing the software library in the defined repository with that software library in the data structure,
      wherein the population and synchronization tool, before performing the replacement, operates to determine whether the software library to be replaced in the defined repository has been previously modified by a user, and, if the software library is determined to have been modified, warn the user that the modified software library is to be replaced.

9. The method of claim 8, wherein the library file is a project object model (POM) file that defines coordinates for that software library.

10. The method of claim 8, wherein the corresponding location file defines a relative path to an actual binary file associated with a software library.

11. The method of claim 8, where the data structure includes at least one software library associated with a library file that includes POM as a packaging type.

12. The method of claim 8, wherein the population and synchronization tool operates to install the software library in the data structure to the defined repository if that software library does not already exist in the defined repository.

13. The method of claim 8, wherein the population and synchronization tool is triggered either manually by a user or automatically at a configurable interval.

14. The method of claim 8, wherein, upon the warning, the user is prompted to select whether to replace the software library in the defined repository with that software library in the data structure.

15. A non-transitory computer readable storage medium, including instructions stored thereon which when read and executed by one or more computers cause the one or more computers to perform the steps comprising:
  providing an execution environment, executing on one or more microprocessors, that includes a plurality of software libraries, wherein each software library is associated with a library file describing that software library; and
  invoking a population and synchronization tool plugged into the execution environment, wherein the population and synchronization tool operates to
    search for each library file associated with a software library
    create a data structure that includes one or more software libraries based on the library file or a corresponding location file, and
    process each software library in the data structure to update a defined repository for use at compile time by performing the steps of
      determining that a software library with a same name already exists in the defined depository
      determining that the two software libraries include different contents, and
      replacing the software library in the defined repository with that software library in the data structure,
      wherein the population and synchronization tool, before performing the replacement, operates to determine whether the software library to be replaced in the defined repository has been previously modified by a user, and, if the software library is determined to have been modified, warn the user that the modified software library is to be replaced.

16. The non-transitory computer readable storage medium of claim 15, wherein the library file is a project object model (POM) file that defines coordinates for that software library.

17. The non-transitory computer readable storage medium of claim 15, wherein the corresponding location file defines a relative path to an actual binary file associated with a software library.

18. The non-transitory computer readable storage medium of claim 15, wherein the population and synchronization tool operates to install the software library in the data structure to the defined repository if that software library does not already exist in the defined repository.

19. The non-transitory computer readable storage medium of claim 15, wherein the population and synchronization tool is triggered either manually by a user or automatically at a configurable interval.

20. The non-transitory computer readable storage medium of claim 15, wherein, upon the warning, the user is prompted to select whether to replace the software library in the defined repository with that software library in the data structure.

* * * * *